United States Patent
van Beek

(10) Patent No.: US 8,736,767 B2
(45) Date of Patent: May 27, 2014

(54) EFFICIENT MOTION VECTOR FIELD ESTIMATION

(75) Inventor: Petrus J. L. van Beek, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 507 days.

(21) Appl. No.: 12/893,436

(22) Filed: Sep. 29, 2010

(65) Prior Publication Data

US 2012/0075535 A1 Mar. 29, 2012

(51) Int. Cl.
*H04N 5/14* (2006.01)

(52) U.S. Cl.
USPC .......................................... 348/699

(58) Field of Classification Search
None
See application file for complete search history.

(56) References Cited

U.S. PATENT DOCUMENTS

| | | | |
|---|---|---|---|
| 5,619,273 A | 4/1997 | Sugiyama | |
| 6,091,460 A | 7/2000 | Hatano et al. | |
| 6,480,670 B1 * | 11/2002 | Hatano et al. | 386/329 |
| 6,639,944 B1 | 10/2003 | De Haan et al. | |
| 2004/0240550 A1 * | 12/2004 | Suzuki | 375/240.16 |
| 2005/0129122 A1 * | 6/2005 | Booth et al. | 375/240.16 |
| 2005/0243926 A1 | 11/2005 | Hubrich et al. | |
| 2005/0259739 A1 | 11/2005 | Nakamura et al. | |
| 2006/0062303 A1 | 3/2006 | Xu | |
| 2009/0168887 A1 | 7/2009 | Lin | |

FOREIGN PATENT DOCUMENTS

| | | |
|---|---|---|
| EP | 0415491 A1 | 3/1991 |
| EP | 0474276 A1 | 3/1992 |
| EP | 0578290 A1 | 1/1994 |
| JP | 05-199514 A | 8/1993 |

OTHER PUBLICATIONS

International Search Report, mailed Dec. 27, 2011, PCT/JP2011/072697, filed Sep. 26, 2011, Sharp Kabushiki Kaisha, 7 pgs.

* cited by examiner

*Primary Examiner* — Sath V Perungavoor
*Assistant Examiner* — Kate Luo
(74) *Attorney, Agent, or Firm* — Chernoff Vilhauer McClung & Stenzel, LLP

(57) ABSTRACT

A system for producing a motion vector field for a current frame, where the system includes an estimator that selects an initial motion vector from a set of candidate motion vectors and a refiner that refines the initial motion vector.

39 Claims, 8 Drawing Sheets

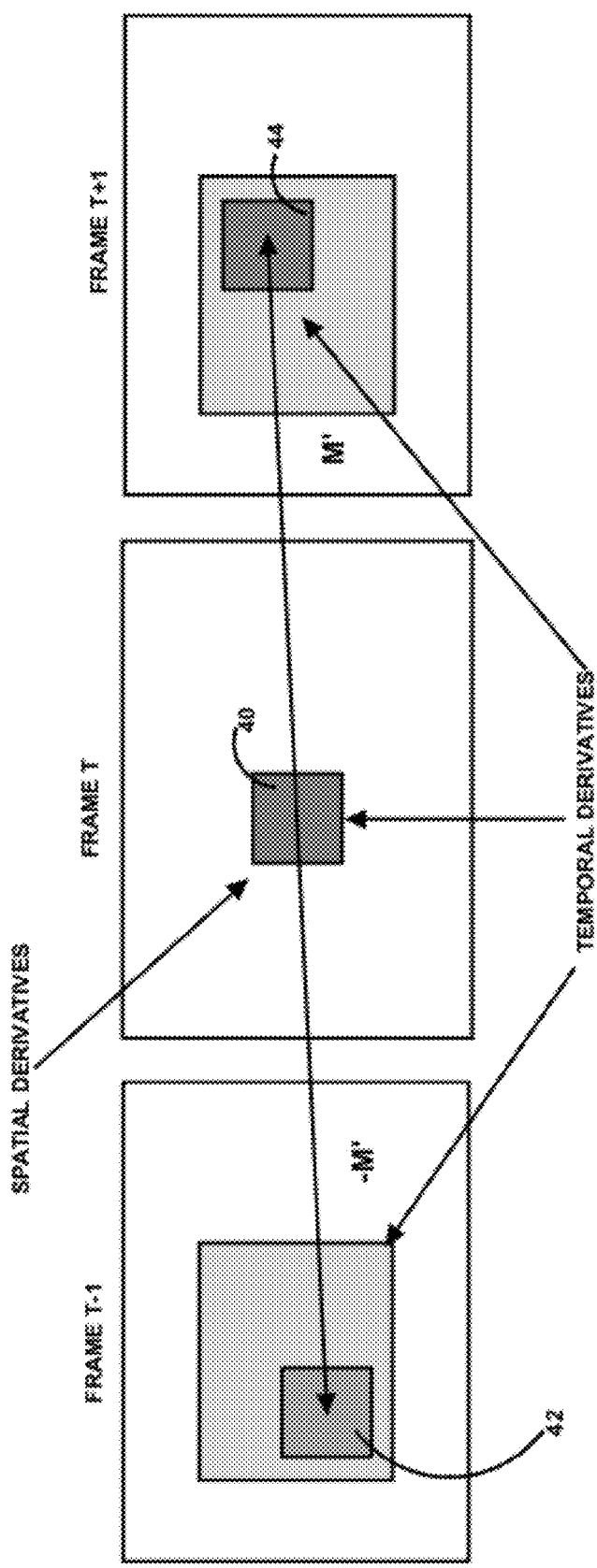

EFFICIENT MOTION VECTOR FIELD ESTIMATION

CROSS-REFERENCE TO RELATED APPLICATIONS

Not applicable.

BACKGROUND OF THE INVENTION

Next-generation high-resolution display devices will have a display resolution that likely exceeds even the high-definition video formats now prevalent, such as 1080i, 720p, and even 1080p. There will thus likely be the need for spatial upconversion and/or format conversion techniques to display content on such next-generation devices, as well as noise reduction and image enhancement techniques. In addition, these devices may well utilize frame rates that exceed those used in existing display devices, highlighting the need for temporal upconversion as well.

Both spatial and temporal upconversion, as well as noise reduction and image enhancement, benefit from accurate motion estimation. Techniques that use motion estimation have been shown to outperform those that simply use single-frame image processing methods. Motion estimation for purposes of motion-compensated temporal video filtering or upconversion, as just described, is more rigorous than motion estimation used for video compression, e.g. MPEG, H.264 in that the goal of motion-compensated temporal video filtering or upconversion, it is important to estimate the "true motion", i.e. the two-dimensional flow arising from the projection of three-dimensional motion in the scene. In other words, whereas video coding standards are merely concerned with finding an optimal motion vector that minimizes residual information that needs to be encoded, the goal of motion-compensated temporal video filtering or upconversion is to find a motion vector that corresponds to actual motion (translational, rotational, etc) in a frame.

Though motion vectors may relate to the whole image, more often they relate to small regions if the image, such as rectangular blocks, arbitrary shapes, boundaries of objects, or even individual pixels. Motion vectors may be represented by a translational model or many other models that approximate the motion of a real video camera, such as rotation, translation, or zoom. There are various methods for finding motion vectors. One of the popular methods is block-matching, in which a frame is subdivided into rectangular blocks of pixels, such as 4×4, 4×8, 8×8, 16×16, etc., and a motion vector (or displacement vector) is estimated for each block by searching for the closest-matching block, within a pre-defined search region, of a subsequent or preceding frame. Block-matching algorithms make use of certain evaluation metrics such as mean square error (MSE), sum of absolute difference (SAD), sum of square difference (SSD), etc. to determine whether a given block in reference frame matches a search block in a current frame. A reference image block is found to be a matching block by applying a motion vector with integer-pixel accuracy or sub-pixel accuracy. Different searching strategies such as cross search, full search, spiral search, or three-step search may also be utilized to evaluate possible candidate motion vectors over a predetermined neighborhood search window to find the motion vector.

Numerous variations of this method exist, which may differ in their definition of the size and placement of blocks, the method of searching, the criterion for matching blocks in the current and reference frame, and several other aspects. Methods based on block matching are prevalent in practical video processing applications. However, a major challenge for practical implementation in hardware products is the large computational cost associated with most basic full-search block matching methods. A large number of prior art methods are focused on reducing the search space for block matching in order to reduce computational cost. The high computational cost of search-based block matching continues to be a problem.

In particular, given the prevalence of the block-matching technique in which pixels of an image are grouped together into regions as small as 4×4 pixels, high-quality encoding techniques may define motion vectors at a sub-pixel resolution. For example, a motion vector associated with a 4×4 pixel block (the highest block resolution) would be able to distinguish motion at a single-pixel resolution in the actual image. Alternatively, if a larger block size were used, say an 8×8 block, single pixel resolution for defining motion between blocks could require eighth-pixel accuracy or greater in a motion vector. As can easily be appreciated, block matching motion vector compression techniques require high computational cost when sub-pixel estimation is used.

Theoretical and experimental analyses have established that sub-pixel accuracy has a significant impact on the performance of motion compensation. Sub-pixel accuracy mainly can be achieved through interpolation. Various methods of performing interpolative up-sampling in the spatial domain or frequency domain have been proposed over the years. One major concern of implementing interpolative sub-pixel methods, however, is the computation cost. For example, to achieve one-eighth pixel accuracy, an image-processing system needs to handle the storage and manipulation of data arrays that are 64 times larger than integer-pixel motion estimation.

Gradient-based motion estimation is another important class of motion estimation methods. In gradient-based motion estimation, local motion is estimated using local spatial and temporal image derivative values (gradients) in a local analysis window which together correlate with motion in an image. Gradient-based methods have not been used frequently in practical applications. One reason may be that gradient-based methods are often applied on a pixel-by-pixel basis, to estimate a dense optical flow field. Also, most gradient-based optical flow estimation techniques involve iterative optimization involving all the image data across entire frames. Such algorithms pose computational challenges that are intractable for practical hardware implementation. Another challenge with basic gradient-based techniques is that they are only suitable to estimate small motion vectors (or small displacements). Hence, coarse-to-fine strategies, as well as iterative optimization, are often invoked.

Motion estimation is a very challenging problem for other reasons as well. The assumptions used in many motion models do not hold exactly at all image locations. For example, a basic assumption is that the color or brightness of a pixel or block of pixels is preserved from one video frame to the next. Another well-known problem is that the data may not sufficiently constrain the motion model to arrive at a reliable solution. Another well-known problem is formed by occlusions, areas in one image that do not appear in the other image. Another well-known problem is that of the noise, such as camera noise or compression noise. Hence, there is a strong need for robustness.

To overcome some of these challenges, it is often beneficial to utilize the concept of spatial consistency or coherency, which states that real-world surfaces have a spatial extent and areas on a single surface are likely to be moving with the same or very similar motion. The spatial extent of object surfaces is often larger than the extent of the single pixel or pixel block for which motion has to be estimated. Therefore, local motion vectors that model the motion of single pixels or small pixel blocks are often similar to their neighboring motion vectors. This leads to the introduction of the well-known motion smoothness constraint, used very commonly in prior art methods. However, the assumption of spatial consistency does not hold at motion boundaries, which often coincide with object boundaries. This often leads to motion fields that are overly smooth at object boundaries. Recent approaches have used more advanced forms of the spatial smoothness constraint that allow breaking smoothness at motion boundaries. Other approaches are robust estimation techniques, which allow for multiple motions to exist in areas of the image where smoothness would otherwise be enforced.

Likewise, it is often beneficial to utilize the concept of temporal consistency or coherency, which states that real-world objects have inertia, and that their motion may not change significantly from one video frame to the next. Therefore, motion vectors that were estimated in previous frames may be of significant help in estimating a motion vector in a new frame. This assumption can be incorporated into a motion estimation algorithm in various ways. The most common technique in existing practical applications is simply to use motion vectors in previous frames as predictors for estimation of a motion vector in the current frame. Subsequently, the predicted motion vector is updated based on block matching, using a local search technique in a restricted area.

Therefore, there is a still a need for more robust, efficient, and accurate methods for estimating motion vector fields for video processing.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 8 graphically shows derivatives calculated in a gradient-based method of updating a candidate motion vector.

DETAILED DESCRIPTION OF PREFERRED EMBODIMENT

As noted earlier, motion estimation correlates areas in different video frames belonging to the same depicted object using motion vectors. The motion of objects in the actual scene (as well as motion of the camera) results in moving visual patterns in the video frames. The goal of true motion estimation is to estimate the two-dimensional (2D) motion of a visual pattern from one frame to another, in such a way that the estimated 2D motion is the projection of the actual three-dimensional scene motion. In general, global motion can be distinguished from local motion. Global motion usually refers to the description or estimation of the motion across an entire video frame, such as the motion caused by a camera pan or zoom. Of particular relevance, however, is local motion estimation, where the goal is to estimate a local motion vector for small image areas, such as for a single pixel, or a small block of pixels (e.g. 2×2, 4×4 or 8×8 pixels). The set of motion vectors for all pixels or pixel blocks across an entire image or video frame is called either a "motion vector field", a "motion field", or sometimes the "flow field." Local image motion may also be also called "optical flow." Furthermore, the term "sub-pixel motion estimation" refers to a technique in which the precision of the motion vector or displacement vector is expressed in units smaller than the distance between adjacent pixels. For example, sub-pixel motion estimation with quarter-pixel precision results in motion vectors that may point to locations on a grid that is 4 times as fine as the original pixel grid.

The estimated motion field has many potential uses in video processing, video coding and computer vision. Example applications are motion-compensated video coding, motion-compensated video filtering, and motion-compensated frame interpolation. Motion Estimation (ME) is very beneficial for high-quality multi-frame video processing, such as multi-frame super-resolution upscaling, temporal frame rate conversion, noise reduction, and enhancement. Multi-frame video processing utilizes one or more frames in addition to the current frame, and may perform motion-compensated temporal filtering. This can achieve superior noise reduction and resolution enhancement, compared to single-frame video processing.

Figure 1:
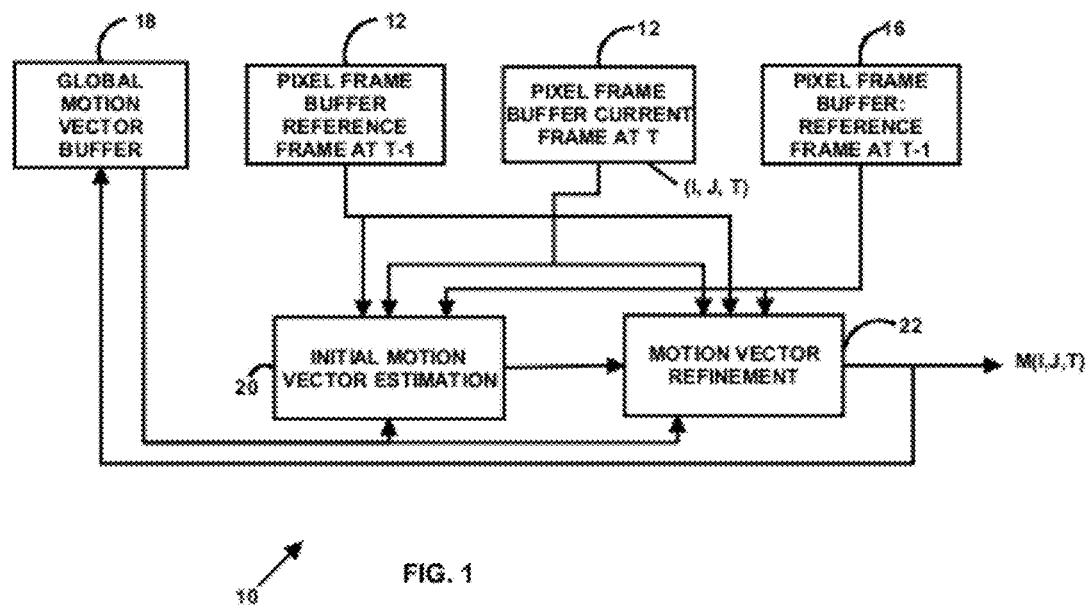
FIG. 1 shows an exemplary motion vector field estimation system having several pixel frame buffers, an initial motion vector estimator, and a motion vector refiner.

Referring to FIG. 1, which depicts an exemplary motion vector field estimation system 10, a video frame at time t may be considered a current frame, where a video frame at time t+1 is a frame subsequent to the current frame and a video frame at time t−1 is a frame preceding the current frame. The objective is to estimate motion vectors for the current frame at time t. Motion vectors may be either forward motion vectors, e.g. defined from frame t to t+1, or backward motion vectors, e.g. defined from frame t to t−1. The system 10 uses at least one of frame t−1 or frame t+1 as a reference frame, and potentially both. The pixel data for the current and reference frames is held in memory buffers 12, 14, and 16, respectively. Pixel data may be the luminance component of an image, or may also include color data if available. The system also has a memory buffer 18 holding global motion vectors. Preferably, the system 10 always stores motion vector data in the reference frame buffer 12 for the preceding frame, if available (e.g., when the current frame is not the first frame of the video sequence).

The motion estimation system consists of two main units, an initial motion vector estimator 20 and a motion vector refiner 22. The Initial Motion Vector Estimator 20 obtains an initial estimate of a motion vector by selecting a motion vector from a candidate set of motion vectors and the Motion Vector Refiner improves the initial estimate by computing an optimal update. In a preferred embodiment, this update is based on a gradient-based method.

The system 10 for estimating a motion vector field may be a single-pass system, i.e. one requiring only a single pass over the image frames. For example, the process may start at a location near the top left of the video frame, performing the motion vector estimation process (including both above-mentioned stages) at that location, before moving on to the next location such as a location to the right of the first location. This process may continue in a raster-scan fashion, computing a motion vector at each desired location in the video frame, until a location near the bottom right of the video frame. The single-pass method means that there is no global iteration or recursion across the entire frame; also, there are no hierarchy layers for coarse-to-fine estimation.

For purposes of illustration, assume that a raster scan sequence for computing motion vectors proceeds from top left to bottom right as previously described, although it should be understood that other types of scans may be used as well. Completion of the scan across the video frame results in an output motion vector field. The locations where a motion vector is computed fall on a regular rectangular grid of locations across the frame. For example, the system may compute a motion vector at each pixel in the frame, or may compute a motion vector for each 2×2 pixel block, or for each 4×4 pixel block, etc. In a preferred embodiment, a motion vector may be computed for small pixel blocks, e.g. 2×2 or 4×4 pixel blocks. This saves computational cost compared to computing a motion vector at every pixel. This level of resolution for the resulting motion vector field has shown to be sufficient for several video processing applications.

For example, as indicated in FIG. 1, a motion vector may be computed at coordinate (i, j, t), meaning location (i, j) in frame t. The motion vector may be computed using pixel data from the current frame (t) as well as from one or more reference frames (e.g. t−1 and t+1). The estimation process may also utilize one or more memory buffers to store computed motion vectors. Motion vectors that were previously computed can be used advantageously to estimate a new motion vector. In the disclosed system 10, motion vectors stored in the motion vector buffer may be used in at least two ways. First, previously computed motion vectors are used to predict motion vectors that are to be computed. That is, sets of previously computed motion vectors from the motion vector buffer may be formed, called candidate sets. The motion vectors in these candidate sets are chosen based on assumptions of spatial and temporal consistency, such that they are useful predictors for the motion vector that is to be computed. During the Initial Motion Vector Estimation stage 20, the best motion vector from the combined candidate set is selected. By intelligent construction of the candidate sets, the number of vectors in a local set can be kept small. This allows a very significant reduction of the computational cost, compared to many existing methods that perform search-based block matching motion estimation. At the same time, the number of motion vectors in a candidate set is fixed, which is advantageous for hardware implementation. In many existing block matching motion estimation methods with fast search, it is not known in advance how many motion vectors need to be tested, which presents a challenge for hardware implementation. While the candidate sets can be kept small, the disclosed system 10 still allows for correctly estimating fast motions, i.e. finding large motion vectors.

Second, previously computed motion vectors are used during the estimation of new motion vectors to enforce spatial and temporal consistency in the resulting motion vector field. Enforcing spatial and temporal consistency to a desired degree has been shown to be very beneficial in motion estimation, as it helps to estimate "true" motion, and reduces the effects of noise in the data, and also counteracts the effects of motion model violations in the image data, thereby improving robustness of the system 10. Spatial consistency is preferably enforced adaptively, such that smoothness of the motion field is not enforced across image edges. Thus, the system 10 avoids unnecessary smearing of the motion field at object boundaries, while reducing noise in the motion vectors in the interior of objects. Spatial and temporal consistency may be enforced in the Initial Motion Vector Estimation stage 20. Also, spatial consistency may be enforced in the Motion Vector Refinement stage 22.

As discussed, the system 10 uses selection of the best initial motion vector among small candidate sets during the Initial Motion Vector Estimation stage 20. In this first stage, the motion vectors considered may all have integer-pixel accuracy, thus avoid the need for sub-pixel motion estimation using block matching methods. This reduces computational cost, since the expensive operations needed for sub-pixel block matching are avoided. Furthermore, the system 10 may use gradient-based computation of a motion vector update during the Motion Vector Refinement stage 22. The gradient-based method allows computation of a sub-pixel motion vector without the expensive calculations needed for sub-pixel block matching. The gradient-based method is very effective and accurate during this stage, since the update that needs to be computed on the initial estimate is usually small. If used, the gradient-based motion vector refinement method may have lower computational cost compared to a block matching method.

Thus, the combination of an Initial Motion Vector Estimation stage 20 that selects a vector from small candidate sets with a Motion Vector Refinement stage 22 based on the gradient-based method is very advantageous. This system 10 allows robust, accurate estimation of motion vectors in video in a very efficient manner (at reduced computational cost). Furthermore, the system 10 can further increase temporal consistency and robustness by optionally using a 3-frame symmetric motion estimation method, later described with respect to FIG. 6, which utilizes image data from the current frame and two reference frames, instead of the conventional two-frame motion estimation method. Furthermore, the system 10 may use explicit spatial and temporal motion vector consistency constraints, which may be enforced in an adaptive manner.

Figure 2:
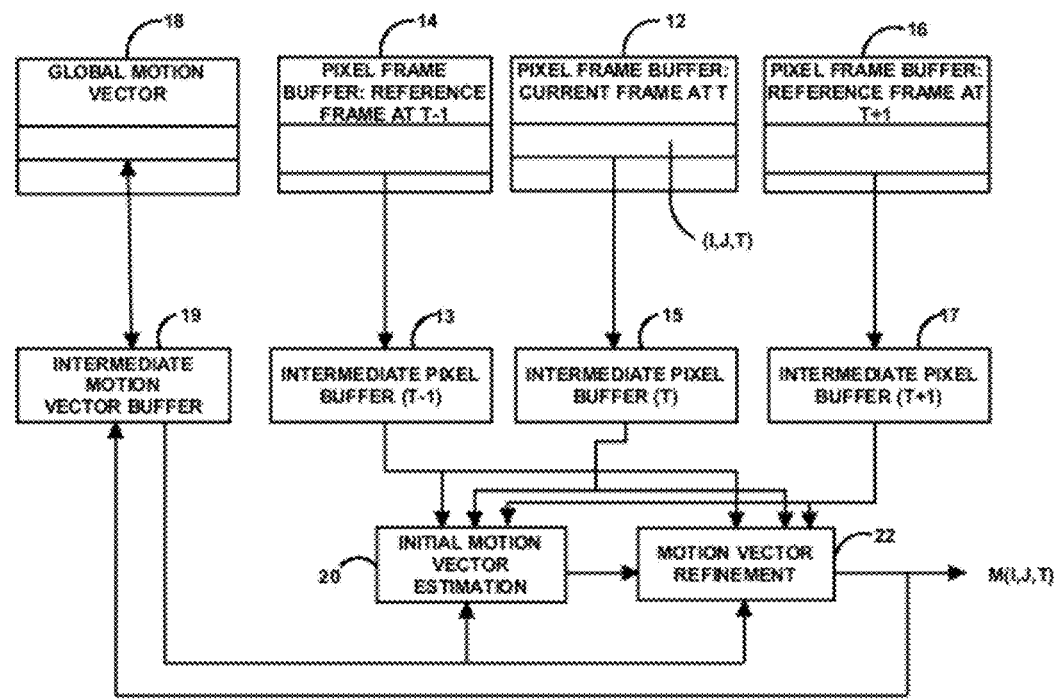
FIG. 2 shows an alternative motion vector field estimation system appropriate to some hardware implementation, and including on-chip intermediate buffers supplemented by off-chip frame buffers.

In FIG. 2, an alternate embodiment of the system 10 is shown, illustrating the use of intermediate pixel buffers 13, 15, and 17, and an intermediate global motion vector buffer 19. Use of these intermediate buffers is often appropriate in hardware implementations where there is often not sufficient memory to hold entire video frames, or motion vector fields on the motion estimation chip. Hence, this data may be stored in off-chip memory. A portion of the video frames and a portion of previously computed motion vectors may be held in smaller on-chip memory, indicated in FIG. 2 by the intermediate buffers 13, 15, and 17. In particular, in hardware implementations, the buffers 13, 15, and 17 may be line buffers each holding a portion of a respective video frame corresponding to a line of pixel data. This portion of the video frame contains the data that is relevant for computing a motion vector at particular locations in the frame. Likewise, the intermediate global motion vector buffer 18 may hold previously computed motion vectors that are relevant to estimating new motion vectors at particular locations in the frame. The system 10 may be implemented using line buffers, but is not limited to the use of line buffers, or other intermediate buffers necessary to handle limited on-chip memory. In the following description, this aspect of the system implementation may be omitted for clarity. This type of hardware implementation does impact the system design in that it constrains the range of motion vectors, i.e. the magnitude of motion vectors will have a fixed limit.

Motion Vector Data

Figure 3:
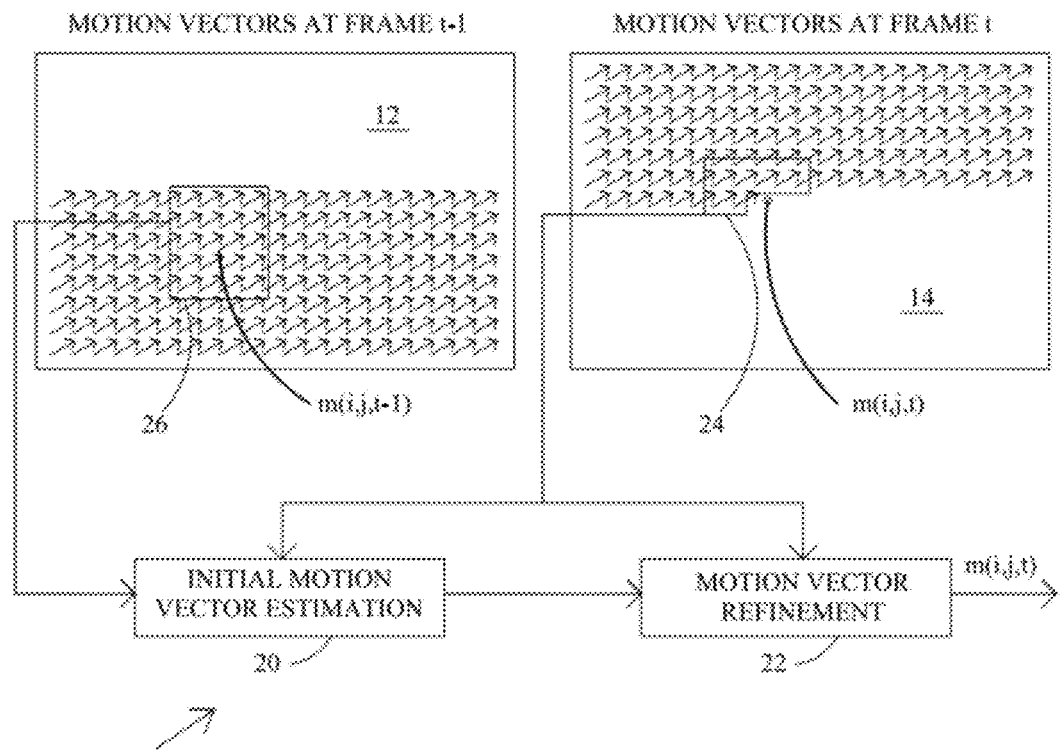
FIG. 3 shows one embodiment of the system of FIG. 1 further illustrating motion vectors stored by the pixel frame buffers.
Figure 4:
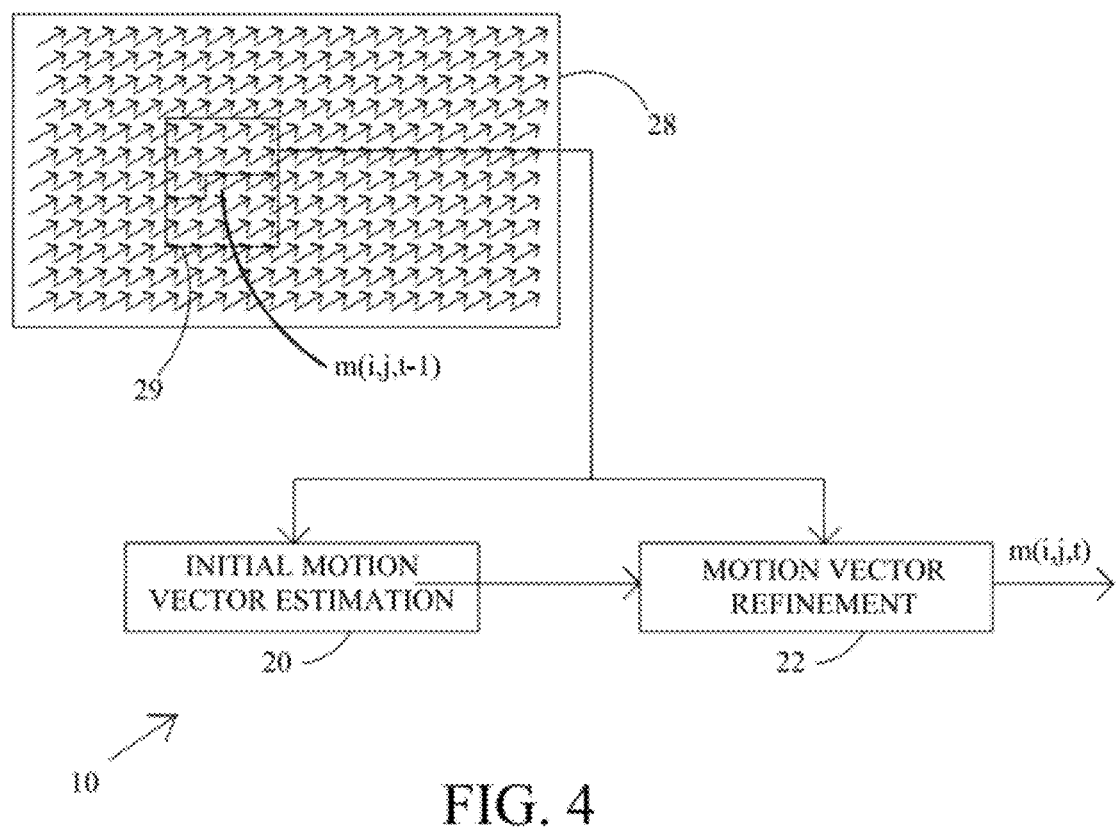
FIG. 4 shows an alternate embodiment of the system of FIG. 3.

FIGS. 3 and 4 provide further detail of the contents and use of the motion vector buffer(s) containing previously computed motion vectors. Assume for illustrative purposes that the system is estimating a motion vector at location (i, j) in frame t. This motion vector is denoted by $$m(i, j, t) = \begin{bmatrix} m_h \\ m_v \end{bmatrix}$$

where $m_h$ is the horizontal displacement component and $m_v$ is the vertical displacement component. Note that the dependency on (i,j) will frequently be implicit in the following discussion and equations.

FIG. 3 shows a first embodiment. The system 10 may have stored motion vectors that were previously computed on the current frame (at top right). Assuming a raster scan across the frame, this may include motion vectors at locations up to but not including (i,j). A small causal window 24 may be conceptually defined on the grid of motion vector locations that include locations near (i,j), and considered a motion vector prediction and motion vector consistency window. The motion vectors in the buffer 14 at locations in this window 24 may be used as candidate motion vectors in the Initial Motion Vector Estimation stage 20 to be used in spatial prediction. These motion vectors may also be used to compute spatial consistency constraint terms in the Motion Vector Refinement stage 22.

The system 10 may also have stored motion vectors that were previously computed on a previous frame (at top left). This may include motion vectors at locations throughout the frame, since the motion vectors at all these locations in the previous frame have already been computed. However, again assuming a particular raster scan, several motion vectors may be discarded as they may not be useful in computing the motion vector at in the current frame at (i,j,t). This reduces the memory requirements. Another window 26 may be defined on the grid of motion vector locations for the previous frame. This small window 26 may be centered on (i,j), but include several motion vectors at neighboring locations. The distance of these neighboring locations to the center location may be a parameter. Again, the motion vectors in the buffer at locations in this window 26 may be used as candidate motion vectors in the Initial Motion Vector Estimation stage 20, to be used in temporal prediction. These motion vectors may also be used in the initial motion vector estimation stage 20 to compute temporal consistency constraint terms.

FIG. 4 shows a second embodiment, with reduced memory requirements compared to the first embodiment. In this case, the system 10 may have stored motion vectors that were previously computed on the current frame as well as motion vectors that were previously computed on the previous frame organized on a single grid. That is, a single grid of locations for motion vectors from the current and previous frame is considered. Again assume for purposes of illustration only, a raster scan sequence from top left to bottom right. At locations that are visited in this sequence prior to visiting location (i,j) in the current motion vector field, motion vectors in the current frame have already been computed, and these may be stored in the motion vector buffer 28. At location (i,j) and locations that will be visited after location (i,j) in the sequence, motion vectors in the current frame have not been computed yet. However, motion vectors computed for the previous frame (the previous motion vector field) are available and may be associated with these locations. Hence, a single motion vector buffer 28 may hold motion vectors from the motion vector field currently being computed as well as motion vectors from a previously computed motion vector field.

A single window 29 may be defined on the grid of motion vector locations for the purposes of motion vector prediction and consistency. This small window may be centered on (i,j), and includes several motion vectors at neighboring locations. Again, the motion vectors in the buffer 28 at locations in this window 29 may be used as candidate motion vectors in the Initial Motion Vector Estimation stage. This includes both spatial prediction motion vectors and temporal prediction motion vectors, since these motion vectors may be associated with the current or previous motion vector field. These motion vectors may also be used to compute temporal consistency constraint terms in the Motion Vector Estimation stage 20 and to compute spatial consistency constraint terms in the Motion Vector Refinement stage 22. The exact choice of motion vectors in the motion prediction and consistency windows may be configurable and is discussed later.

Output motion vectors computed by the system may have sub-pixel precision and hence be accurate. However, motion vectors that are stored in the motion vector buffers for the purposes of prediction and consistency may not necessarily need to be stored at sub-pixel precision. Motion vectors may be stored with reduced precision in these buffers in order to reduce the memory requirements of the system. By limiting both the motion vector range and vector precision, each motion vector needs a reduced number of bits for storage.

It is furthermore possible to reduce the number of motion vectors that are stored in the buffer, by selecting only motion vectors that satisfy certain conditions. This further reduces the memory requirements.

Frame (Pixel) Data

Figure 5:
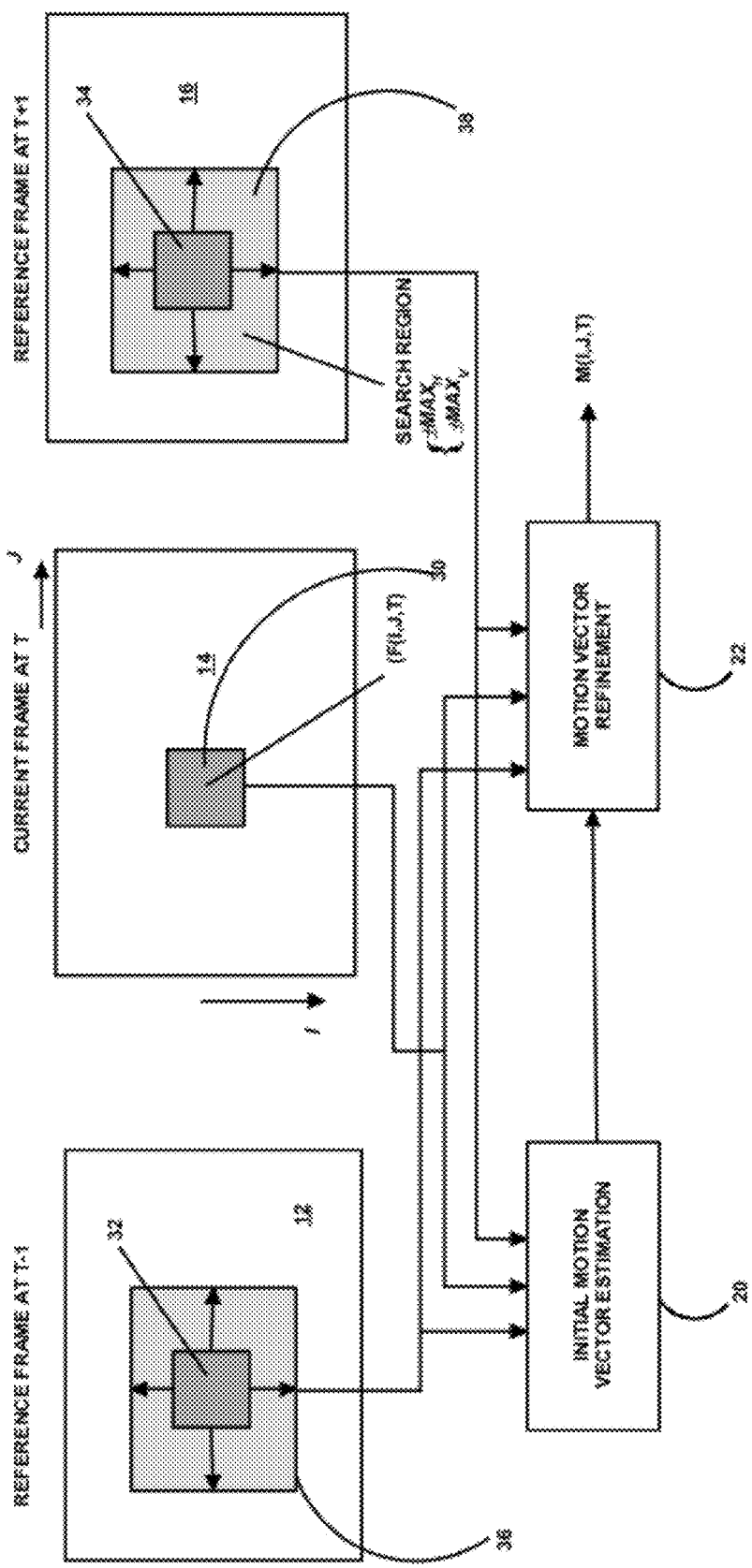
FIG. 5 depicts the manner in which the system of FIG. 1 uses search regions in reference frames to calculate a motion vector field.

FIG. 5 provides further detail of the contents and use of the video pixel buffer(s). Pixel data, for example luminance data, is denoted by f(i,j,t). Assume that the system is estimating a motion vector at location (i, j) in frame t. An image measurement window 30 containing pixels at locations around (i, j) is considered in the current frame t. The measurement window 30 may be a square or rectangular area in the frame, of size $S_h \times S_v$. For example, the image measurement window may be 8×8 pixels, 13×13 pixels, 8×16 pixels, 16×8 pixels, 16×16 pixels, or 17×17 pixels. Image measurement windows at subsequent motion vector locations may overlap each other. Similar image measurement windows may be defined in the reference frame(s). To estimate a motion vector at (i, j) in the current frame, the measurement window 30 in the current frame may be compared in some manner to identically-sized windows 32 and/or 34 in the reference frame(s) 12 and/or 16, respectively. To allow motion vectors with a limited range, the windows 32 and 34 may float within larger search regions 36 and 38 defined in the reference frame(s) 12 and/or 16, respectively. The search regions 36 and 38 are defined by the size of the image measurement window 30 and the motion vector range, which is expressed as $\pm max_h$ pixels horizontally, and $\pm max_v$ pixels vertically. For example, the magnitude of the horizontal and vertical components of a motion vector may be at most 16 pixels. The horizontal range may be different from the vertical range. The locations and sizes of the measurement windows and search regions determines which pixel data from the current and reference frames frame can be accessed in order to estimate a local motion vector at (i, j). This pixel data is used in both motion estimation stages, albeit in different ways.

To further reduce memory requirements and computational cost, all input video frame data may be down-sampled by a fixed factor. For example, the input frames may be down-sampled (by filtering and sub-sampling) by a factor of 2 horizontally and vertically. This significantly reduces the memory requirements for on-chip memory in a hardware implementation. In this case, all stages operate on the down-sampled pixel data. Note that the system 10 is still able to achieve sub-pixel accurate motion vectors relative to the original pixel grid before downsampling, because a gradient-based method is used in the motion vector refinement stage 22. Such a reduction of memory and computational cost can not be achieved in existing systems where block matching is used in the refinement stage, since significant re-interpolation of intermediate pixels would be necessary to achieve sub-pixel or even integer-pixel precision.

Three-Frame Symmetric Motion Estimation

Figure 6:
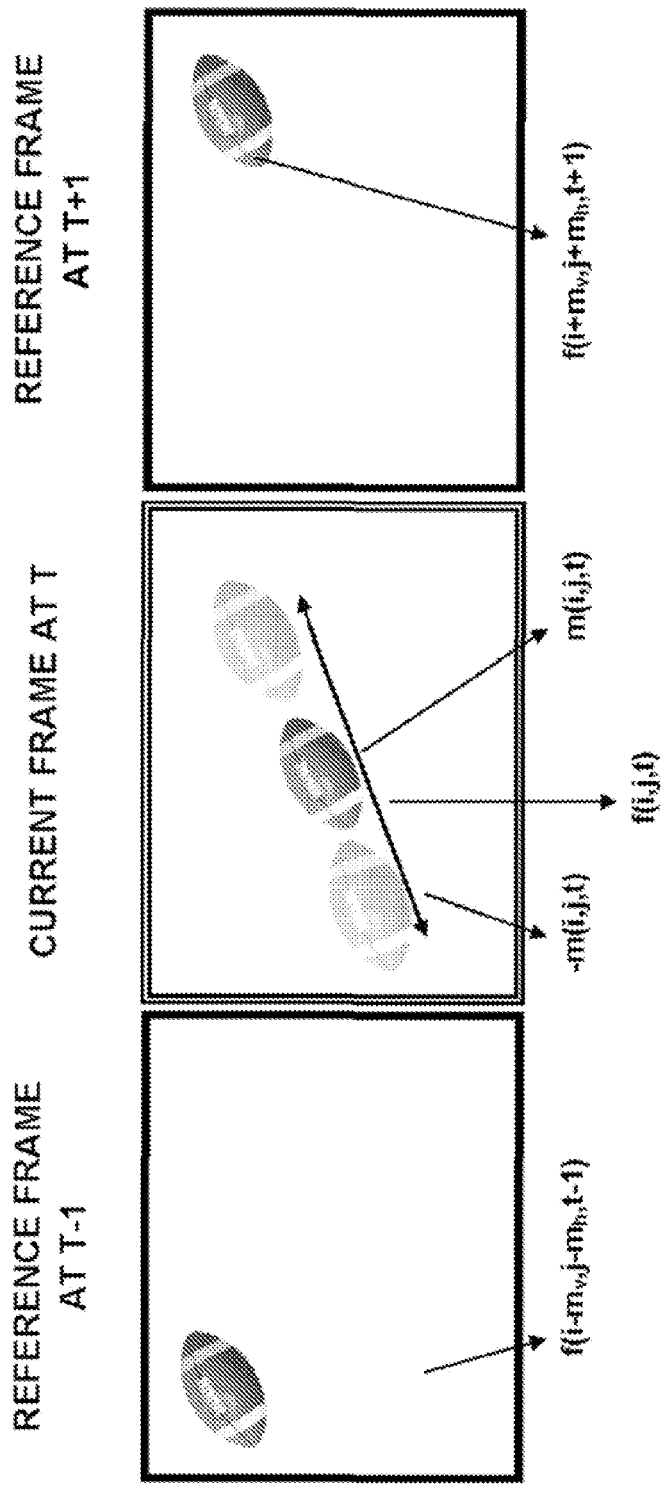
FIG. 6 illustrates a three-frame symmetric motion estimation technique.

As implied in the preceding discussion and as further shown in FIG. 6, the system 10 may optionally employ a three-frame symmetric motion estimation technique, where the system 10 utilizes the current frame (t) as well as two reference frames (e.g. at time t−1 and time t+1). A single motion vector field is estimated that describes the motion from the current frame to both reference frames simultaneously. The underlying motion model assumes that motion trajectories are linear within the short time span of the 3 frames centered on the current frame. For example, as illustrated in FIG. 6, an object with motion may be visible in the 3 frames. The three-frame symmetric motion constraint is such that the motion vector describing the motion from frame t (current) to t+1 (reference) is assumed identical to the motion vector describing the motion from frame t (current) to t−1 (second reference). The only difference between the first and second motion vector may be the sign being reversed, or an appropriate fixed scaling factor in case the second reference frame is further or closer away (in time) from the current frame compared to the first reference frame. Hence, only a single motion vector describes the motion to both reference frames, and the corresponding location in either reference frame can be derived from that motion vector.

This technique can be seen to enforce temporal consistency and to reduce the effects of noise, hence to increase robustness in motion estimation. Furthermore, this method improves overall performance of a motion-compensated video processing system, if that system utilized motion-compensated data from multiple reference frames. An example is multi-frame motion-compensated temporal filtering, for the purposes of noise reduction and/or upscaling. If temporal filtering involves multiple frames other than the current frame, for example two reference frames, performance is improved by including the data in those frames in the motion estimation stage, compared to using motion vectors estimated using a single reference frame only. Performance would be further improved if multiple motion vector fields would be computed, namely one motion field for each reference frame. However, this increases computational cost significantly. Three-frame symmetric motion estimation increases computational cost by a limited amount only, as described below in further detail.

Initial Motion Vector Estimation Stage

In the Initial Motion Vector Estimation Stage 20, a small set of candidate motion vectors is constructed, using previously computed motion vectors in a spatial and temporal neighborhood of the current location (i,j,t). The initial motion vector is selected from the vectors in the candidate set based on a cost function. A local candidate set is constructed using several types of prediction candidates, such as spatial prediction candidates and temporal prediction candidates. More specifically, the different types of candidates are defined as follows:

(1) The zero motion vector, forming a subset of 1 vector denoted by ZMV:

$$ZMV=\{[0,0]^T\}$$

Figure 7:
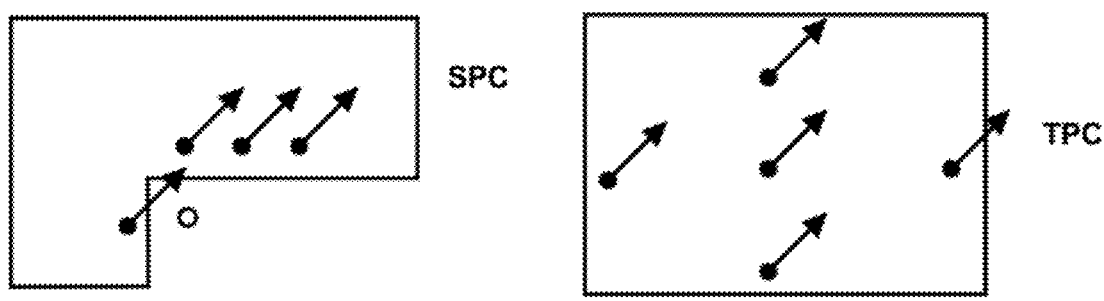
FIG. 7 illustrates exemplary spatial prediction candidate motion vectors and temporal prediction candidate motion vectors used in the system 10.

(2) Spatial prediction candidates, forming a subset denoted by SPC. These include motion vectors previously computed in the current motion field at spatially neighboring locations visited before the current location. For example, assuming a raster scan sequence of locations for computing motion vectors, this subset may include 3 or 4 motion vectors at directly neighboring locations above and to the left of the current location, as shown in FIG. 7. For example:

$$SPC=\{m(i,j-1,t),m(i-1,j-1,t),m(i-1,j,t),m(i-1,j+1,t)\}$$

(3) Temporal prediction candidates, forming a subset denoted by TPC. These include motion vectors computed for a previous motion field at locations neighboring (i,j,t−1). For example, this subset may include the motion vector at (i,j,t−1) as well as 4 motion vectors on either side of that location, at some distance d away from the center location, as also shown in FIG. 7. This distance d is to account for the fact that the location with the best prediction in the previous motion field may be displaced due to the motion. For example d=2 or d=4 steps in the motion vector grid. For example:

$$TPC=\{i,j,t-1),m(i-d,j,t-1),m(i+d,j,t-1),m(i,j-d,t-1),m(i,j+d,t-1)\}$$

(4) The motion vector that was the best initial motion vector at the previously visited location. This forms a subset of a 1 vector denoted by PIM. This motion vector may be different from the motion vectors in the SPC subset, because those were the result of additional motion vector refinement. Inclusion of this candidate has been shown advantageous, reducing the potential for spatial oscillations in the values of estimated motion vectors across the motion field.

(5) Optionally, a set of fixed motion vectors may be used that sparsely populate the search region. This subset of sparse fixed candidates is denoted by SFC. These motion vectors are not derived from neighboring motion vectors, but have fixed values. This subset may be useful in applications where it is important to capture large and sudden (unpredictable) motions in the scene.

$$SFC=\{[\pm r_h,0]^T,[0,\pm r_v]^T,[=r_h,\pm r_v]^T,[\pm 2r_h,0]^T,[0,\pm 2r_v]^T,[=2r_h,\pm 2r_v]^T,\ldots\}$$

Here, the values $r_h$ and $r_v$ are fixed, for example $r_h=2$ and $r_v=2$ pixels.

The final candidate set CS is defined simply as the union of the above subsets. That is:

$$CS=ZMV\cup SPC\cup TPC\cup PIM$$

or, if SFC is included:

$$CS=ZMV\cup SPC\cup TPC\cup PIM\cup SFC$$

Note that the exact number of motion vectors included in the candidate set is configurable, as well as the above-mentioned parameters that determine the locations where prediction motion vectors are retrieved, or other parameters that determine the exact value of the candidate motion vectors. Other motion vectors than the ones indicated in the examples above may be easily included as desired. This may be decided based on application performance as well as computational resources available. The candidate set may be made smaller to reduce computational cost, or may be made larger if computational resources allow.

A first cost function $E_1$ is for selecting the best vector from the candidate set:

$$m' \equiv \begin{bmatrix} m'_h \\ m'_v \end{bmatrix} = \min_{m \in CS} E_1(m)$$

where m' denotes the best vector, and by way of example, $$E_1(m) = SAD(m) + \tau + \lambda_1 \cdot MFC_1(m)$$

This exemplary cost function consists of several terms. The first term is the well-known Sum-of-Absolute-Differences (SAD) criterion. This measures pixel differences across the measurement window in the current frame and reference frame(s). For conventional 2-frame motion estimation, the SAD criterion is:

$$SAD(m) = \sum_{k,l \in \Omega} |f(k,l,t) - f(k - m_v, l - m_h, t - 1)|$$

For symmetric 3-frame motion estimation, the SAD criterion is:

$$SAD(m) = \sum_{k,l \in \Omega} |f(k,l,t) - f(k - m_v, l - m_h, t - 1)| + |f(k,l,t) - f(k + m_v, l + m_h, t + 1)|$$

Note that other well-known criteria may be used instead of the SAD, for example the Sum-of-Squared-Differences (SSD), or Normalized-Cross-Correlation (NCC), etc. The SAD has low computational cost and has been shown to work well.

The second term of the cost function includes may be constant parameter value $\tau$. This penalty value depends on the type of the candidate motion vector (e.g. spatial predictor versus temporal predictor versus other). Specifically, the value is chosen from predetermined values as follows:

$$\tau = \begin{cases} \tau_{ZMV} & \text{if } m \in ZMV \\ \tau_{SPC} & \text{if } m \in SPC \\ \tau_{TPC} & \text{if } m \in TPC \\ \tau_{PIM} & \text{if } m \in PIM \\ \tau_{SFC} & \text{if } m \in SFC \end{cases}$$

These penalty values may be chosen to favor certain types of candidate motion vector relative to other types. For example, the zero motion vector can be favored by using a low value for its penalty parameter relative to the penalty values for other types of candidate motion vectors. Conversely, all other types can be favored by setting the penalty parameter for the zero motion vector relatively high. Selection for each of the types of candidate motion vectors can be tuned for increased application performance. This penalty term may also be omitted.

An optional, third term in the cost function is a Motion Field Consistency (MFC) term. This term may be used to increase spatial consistency and temporal consistency further during the Initial Motion Vector Estimation stage. This term may be weighted by a parameter $\lambda_1 \geq 0.0$. The weight parameter can be used to control the strength of the consistency; i.e. increasing this parameter will increase the smoothness in the motion field. The MFC term itself may consist of separate terms for spatial and temporal consistency. The spatial MFC term may associate a cost to the difference between a candidate motion vector and previously computed motion vectors in a small neighborhood in the current motion field. The temporal MFC term may associate a cost to the difference between a candidate motion vector and previously computed motion vectors in a small neighborhood in the previous motion field. In both cases, the cost may be expressed in terms of absolute or squared differences, for example. The spatial and temporal MFC terms may have separate weighting parameters, which can be controlled separately. The previously computed motion vectors used in this term are located in small motion vector consistency windows, as mentioned before.

The cost function is evaluated for every motion vector in the combined candidate set, which is constructed locally at location WM. The candidate motion vector with the minimum cost is selected as the best vector and is the estimated initial motion vector m'(i,j,t).

Motion Vector Refinement Stage

In the Motion Vector Refinement stage 22, a gradient-based optimization method is used to refine the initial motion vector. An initial motion vector may be denoted for illustrative purposes as m'(i,j,t) and a refined motion vector may be denoted as m"(i,j,t). The objective of refinement is to find an optimal update to the initial motion vector:

$$m'' = \begin{bmatrix} m''_h \\ m''_v \end{bmatrix} = \begin{bmatrix} m'_h + \Delta m'_h \\ m'_v + \Delta m'_v \end{bmatrix}$$

The optimal update is computed based on minimizing a cost function $E_2$:

$$\begin{bmatrix} \Delta m'_h \\ \Delta m'_v \end{bmatrix} = \min_{\Delta m_h, \Delta m_v} E_2(\Delta m_h, \Delta m_v)$$

However, the optimal update is not determined by searching over a candidate set or search region. Rather, the optimal update is computed directly (analytically) using a local gradient-based method. The cost function may consist of two main terms, each of which is data-adaptive:

$$E_2(\Delta m_h, \Delta m_v) = AMC(\Delta m_h, \Delta m_v) + \lambda_2 \cdot MFC_2(\Delta m_h, \Delta m_v)$$

The first term is an Adaptive Motion Constraint (AMC), which is based on the well-known optical flow constraint or brightness constancy constraint equation. It measures how well a motion vector update fits with the pixel data, and is computed using spatial and temporal image derivatives. The second term is a Motion Field Consistency constraint (MFC), which measures local spatial inconsistencies in the motion field resulting from a motion vector update. As before, this term is weighted by a parameter $\lambda_2 \geq 0.0$. The weight parameter can be used to control the strength of the spatial consistency; i.e. increasing this parameter will increase the smoothness in the motion field.

The Adaptive Motion Constraint is defined as follows:

$$AMC(\Delta m_h, \Delta m_v) = \sum_{k,l \in \Omega_1} w_D(k,l)[f_h(k,l)\Delta m_h + f_v(k,l)\Delta m_v + f_t(k,l)]^2$$

which involves the horizontal and vertical spatial derivatives and temporal derivative of the pixel data at locations (k,l):

$$f_h(k,l), f_v(k,l), f_t(k,l)$$

and the summation is over locations in image measurement windows in the current and reference frames. Computation of these derivatives is illustrated in FIG. 8.

The horizontal and vertical spatial derivatives are computed in the current frame, using known derivative filters. For example, these may be computed using small 3×3 or 5×5 derivative filters applied horizontally and vertically. One example is the well-known pair of Sobel filters. Another example may be the derivative-of-Gaussian filters. The spatial derivative values need to be computed for locations in an image measurement window 40 in the current frame, as shown in FIG. 8. This measurement window is centered on the current location (i,j,t). The window may be a square window, for example 7×7 pixels, 11×11 pixels or 15×15 pixels.

The temporal derivative needs to be computed with respect to measurement windows 42 and 44 in the reference frames that need to be offset from the current location (i,j,t) by the initial motion vector m'(i,j,t), as shown in FIG. 8. This is because at this stage the goal is to find an update to this initial motion vector, and the cost function takes this into account. In the 2-frame motion estimation case, either the forward or backward reference frame is used. Hence, the temporal derivative value may be defined by a forward difference filter:

$$f_t^F(k,l) = f(k+m'_v, l+m'_h, t+1) - f(k,l,t)$$

or by a backward difference filter:

$$f_t^B(k,l) = f(k,l,t) - f(k-m'_v, l-m'_h, t-1)$$

In the 3-frame symmetric motion estimation case, a central difference filter is defined:

$$f_t(k,l) = f(k+m'_v, l+m'_h, t+1) - f(k-m'_v, l-m'_h, t-1)$$

using pixel data from both the forward and reference frames. This temporal derivative expression for 3-frame symmetric motion estimation can also be derived by defining separate motion constraints for the forward and backward reference frames. The resulting computation is identical in this case. From the previous expressions, it can be seen that the use of 3-frame symmetric motion estimation does not increase computational cost in the refinement stage. Each expression consists of a simple absolute difference operation.

The weights $w_D(k,l)$ in the first term of the cost function (AMC) are data-adaptive weights. The weight values may be determined adaptively. For example, this weight may be set to 1.0 when the difference between the pixel value at location (k,l) and the pixel value at the current location (i,j) is small; while the weight may be set to a small value when that difference is larger than a threshold. This has been shown to improve performance, as the adaptive weighting provides an implicit discrimination of pixels in the same scene object versus pixels in a different object, at low computational cost. Locations in the same object are weighted such that their pixel data will contribute more to computing the motion vector update, while contributions from other locations are more likely to be suppressed.

The second term in the motion vector refinement cost function measures local spatial inconsistencies in the motion field resulting from a motion vector update. This motion field consistency term is defined as follows:

$$MFC_2(\Delta m_h, \Delta m_v) = \sum_{k,l \in \Omega_2} w_C(k,l) \| \underbrace{m'(i,j) + [\Delta m_h, \Delta m_v]^T}_{} - \underbrace{m''(k,l)}_{} \|^2$$

initial motion vector at (i,j) (already computed) plus motion vector update (to be computed)

final motion vector at neighboring locations (already)

This MFC term utilizes several output (refined) motion vectors at spatially neighboring locations (k,l) that were visited prior to (i,j). For example assuming a raster scan order, these locations may be to the left of and above (i,j). These motion vectors have already been refined and their final values are known. These motion vectors are compared (by taking the difference) with the motion vector that would result from updating the initial motion vector at (i,j) with a particular motion vector update. Note it is this motion vector update that is to be determined. All other terms in the above equation have already been computed at this stage and are simply given. Locations (k,l) are from a small motion vector consistency window, as mentioned before.

The weights $w_c(k,l)$ in the MFC term are data-adaptive weights. The weight values may be determined adaptively. For example, this weight may be set to 1.0 when the difference between the pixel value at location (k,l) and the pixel value at the current location (i,j) is small; while the weight may be set to a small value when that difference is larger than a threshold. This has been shown to improve performance, as the adaptive weighting provides an implicit discrimination of pixels in the same scene object versus pixels in a different object, at low computational cost. This method enforces spatial consistency of the motion field, but avoids enforcing consistency across object boundaries. Hence excessive smoothness/smearing of the motion field is avoided.

Given the cost function $E_2$ for motion vector refinement, the optimal update that minimizes the cost function can be determined. The cost function can be minimized by taking the derivative with respect to the motion vector update components $\Delta m_h$ and $\Delta m_v$, and setting the derivatives to zero. It can be shown that this results in two linear equations that need to be solved simultaneously. The system of two equations can be expressed in matrix-vector form as:

$$\begin{bmatrix} m_{11} & m_{12} \\ m_{12} & m_{22} \end{bmatrix} \begin{bmatrix} \Delta m'_h \\ \Delta m'_v \end{bmatrix} = \begin{bmatrix} b_1 \\ b_2 \end{bmatrix}$$

The matrix coefficients $m_{11}$, $m_{12}$, $m_{22}$, and vector coefficients $b_1$, $b_2$ are given quantities that are computed in terms of the spatial and temporal derivatives in the measurement window around (i,j), and in terms of differences between motion vectors, and in terms of the various data-adaptive weights, as well as the motion field consistency parameter $\lambda_2$. The motion vector update components $\Delta m_h$ and $\Delta m_v$ are the unknowns. The motion vector update components can be computed by solving the 2×2 system of equations:

$$\begin{bmatrix} \Delta m'_h \\ \Delta m'_v \end{bmatrix} = \begin{bmatrix} m_{11} & m_{12} \\ m_{12} & m_{22} \end{bmatrix}^{-1} \begin{bmatrix} b_1 \\ b_2 \end{bmatrix}$$

This can be computed directly. There are a few special cases in solving this system that may be handled appropriately using techniques known in the art, e.g. cases where one or both of the eigenvalues of the above matrix are very small.

The computed update motion vector has sub-pixel precision. The updates are added to the initial motion vector to obtain the final output motion vector at (i,j). Additional checks may be performed to ensure that the final motion vector is within the motion vector range.

The optimal motion vector update can be computed directly in terms of local pixel data and local motion vector data that are available to the motion vector refinement stage, and in terms of various weights and parameters that improve performance and robustness.

It is possible to repeat the local motion vector refinement stage, iteratively improving the final motion vector. However, the system 10 is able to achieve good performance by performing this refinement step only once. This also keeps the computational cost to a minimum.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A system for producing a motion vector field for a current frame, said system comprising:
   (a) an estimator that selects an initial motion vector from a set of candidate motion vectors; and
   (b) a refiner that refines said initial motion vector using gradient-based motion determination in a manner that minimizes a cost function that includes a first term and a second term, said first term based on at least one of an optical flow constraint and brightness constancy constraint and measuring how well a refinement fits with pixel data by using spatial and temporal image derivatives, said second term measuring spatial inconsistency in said motion vector field resulting from said refinement, and where said refiner operates in a manner free from searching regions of frames other than said current frame for content similar to objects associated with respective motion vectors in said motion vector field, and where said estimator selects a motion vector having a resolution at least as coarse as a pixel of said current frame, and said refiner refines the selected said motion vector to have a resolution finer than a pixel of said current frame.

2. The system of claim 1 where said estimator selects said initial motion vector by identifying content, in frames other than said current frame, similar to objects associated with respective motion vectors in said motion vector field.

3. The system of claim 1 where said motion vector field is produced using three-frame symmetric motion estimation.

4. The system of claim 3 where a single motion vector field is produced for said current frame based on both a first reference frame preceding said current frame and a second reference frame subsequent to said current frame.

5. The system of claim 4 where a first motion vector field is produced for said current frame based on a first reference frame preceding said current frame and a second motion vector field is produced for said current frame based on a second reference frame subsequent to said current frame.

6. The system of claim 1 where said estimator selects a motion vector having a resolution coarser than a pixel of said current frame.

7. The system of claim 1 where said initial motion vector is selected by minimizing a cost function.

8. The system of claim 7 where said cost function includes at least one selected one of: (i) a sum-of-absolute-differences criteria; (ii) a sum-of-squared-differences criteria; and (iii) a cross-correlation criteria.

9. The system of claim 7 where said cost function includes at least one penalty value associated with a respective characteristic of at least one potential characteristic of a subset of motion vectors in said candidate set.

10. The system of claim 7 where said cost function includes a term that increases at least one of spatial and temporal consistency in the motion vector field for said current frame.

11. The system of claim 10 where said term is weighted by at least one selected value.

12. The system of claim 11 where said term increases both spatial and temporal consistency in the motion vector field for said current frame and distinguishes between spatial and temporal consistency.

13. The system of claim 1 where said cost function includes a term that measures local spatial inconsistencies in said motion field.

14. The system of claim 13 where said term is weighted.

15. The system of claim 1 where said cost function is minimized by setting its derivative to zero and solving the resultant system of equations.

16. The system of claim 1 where said refiner refines said initial motion vector iteratively.

17. The system of claim 1 where a single motion vector field is produced for said current frame based on both a first reference frame preceding said current frame and a second reference frame subsequent to said current frame.

18. The system of claim 17 where a first motion vector field is produced for said current frame based on a first reference frame preceding said current frame and a second motion vector field is produced for said current frame based on a second reference frame subsequent to said current frame.

19. A system for producing a motion vector field for a current frame, said system comprising:
   (a) an estimator that selects an initial motion vector from a set of candidate motion vectors each having a resolution at least as coarse as a pixel of said current frame and each belonging to a respectively different category of candidate motion vector, by applying a respectively different one of a plurality of penalties to each of a plurality of initial motion vectors in said set, each penalty having a constant value associated with the category of motion vector to which the penalty applies; and
   (b) a refiner that refines the selected said motion vector to have a resolution finer than a pixel of said current frame; where
   (c) said motion vector field is produced using three-frame symmetric motion estimation.

20. The system of claim 19 where said set of candidate motion vectors comprise:
   (a) at least one motion vector in the current motion field spatially neighboring a current location;
   (b) motion vectors for a frame previous to said current frame and at locations neighboring the pixel corresponding to said current location in said current frame; and
   (c) a zero motion vector.

21. The system of claim 19 where said estimator selects said initial motion vector by identifying content, in frames other than said current frame, similar to objects associated with respective motion vectors in said motion vector field.

22. The system of claim 19 where said initial motion vector is selected by minimizing a cost function.

23. The system of claim 22 where said cost function includes at least one selected one of: (i) a sum-of-absolute-differences criteria; (ii) a sum-of-squared-differences criteria; and (iii) a cross-correlation criteria.

24. The system of claim 22 where said cost function includes at least one penalty value associated with a respective characteristic of at least one potential characteristic of a subset of motion vectors in said candidate set.

25. The system of claim 22 where said cost function includes a term that increases at least one of spatial and temporal consistency in the motion vector field for said current frame.

26. A system for producing a motion vector field for a current frame, said system comprising:
  (a) an estimator that selects an initial motion vector from a set of candidate motion vectors where said set of candidate motion vectors comprises:
    (i) at least one motion vector in the current motion field spatially neighboring a current location;
    (ii) motion vectors in a motion field for a frame previous to said current frame and at locations neighboring the pixel corresponding to said current location in said current frame;
    (iii) the zero motion vector;
    (iv) the candidate motion vector that was selected at a location in said current frame immediately preceding said current location; and
    (v) a set of fixed, non-zero motion vectors whose value does not change by location in said current frame and does not change from said current frame to a frame subsequent to said current frame; and
  (b) a refiner that refines the selected said motion vector using gradient-based motion determination in a manner that minimizes a cost function that includes a first term and a second term, said first term based on at least one of an optical flow constraint and brightness constancy constraint and measuring how well a refinement fits with pixel data by using spatial and temporal image derivatives, said second term measuring spatial inconsistency in said motion vector field resulting from said refinement, and where said refiner operates in a manner free from searching regions of frames other than said current frame for content similar to objects associated with respective motion vectors in said motion vector field, and where said estimator selects a motion vector having a resolution at least as coarse as a pixel of said current frame, and said refiner refines the selected said motion vector to have a resolution finer than a pixel of said current frame.

27. The system of claim 26 where each motion vector in said set has a resolution at least as coarse as a pixel of said current frame and said refiner refines the selected said motion vector to have a resolution finer than a pixel of said current frame.

28. The system of claim 26 where said motion vector field is produced using three-frame symmetric motion estimation.

29. The system of claim 28 where a single motion vector field is produced for said current frame based on both a first reference frame preceding said current frame and a second reference frame subsequent to said current frame.

30. The system of claim 29 where a first motion vector field is produced for said current frame based on a first reference frame preceding said current frame and a second motion vector field is produced for said current frame based on a second reference frame subsequent to said current frame.

31. The system of claim 26 where said refiner refines said initial motion vector iteratively.

32. The system of claim 26 where said initial motion vector is selected by minimizing a cost function.

33. The system of claim 32 where said cost function includes at least one selected one of: (i) a sum-of-absolute-differences criteria; (ii) a sum-of-squared-differences criteria; and (iii) a normalized-cross-section-correlation criteria.

34. The system of claim 32 where said cost function includes at least one penalty value associated with a respective characteristic of at least one potential characteristic of a subset of motion vectors in said candidate set.

35. The system of claim 32 where said cost function includes a term that increases at least one of spatial and temporal consistency in the motion vector field for said current frame.

36. The system of claim 35 where said term is weighted by at least one selected value.

37. The system of claim 36 where said term increases both spatial and temporal consistency in the motion vector field for said current frame and distinguishes between spatial and temporal consistency.

38. The system of claim 26 where said term is weighted.

39. The system of claim 26 where said cost function is minimized by setting its derivative to zero and solving the resultant system of equations.

* * * * *

UNITED STATES PATENT AND TRADEMARK OFFICE
CERTIFICATE OF CORRECTION

PATENT NO.         : 8,736,767 B2
APPLICATION NO.    : 12/893436
DATED              : May 27, 2014
INVENTOR(S)        : Petrus J. L. van Beek It is certified that error appears in the above-identified patent and that said Letters Patent is hereby corrected as shown below:

In the Specification

Col. 10, Line 28

Change "TPC = $\{i, j, t-1), m(i-d, j, t-1), m(i+d, j, t-1), m(i, j-d, t-1), m(i, j+d, t-1)\}$"
to read --TPC = $\{m(i, j, t-1), m(i-d, j, t-1), m(i+d, j, t-1), m(i, j-d, t-1), m(i, j+d, t-1)\}$--;

Col. 10, Line 46

Change "SFC = $\{[\pm r_h, 0]^T, [0, \pm r_v]^T, [= r_h, \pm r_v]^T, [\pm 2r_h, 0]^T, [0, \pm 2r_v]^T, [= 2r_h, \pm 2r_v]^T, \ldots \}$"
to read --SFC = $\{[\pm r_h, 0]^T, [0, \pm r_v]^T, [\pm r_h, \pm r_v]^T, [\pm 2r_h, 0]^T, [0, \pm 2r_v]^T, [= 2r_h, \pm 2r_v]^T, \ldots \}$--.

Signed and Sealed this
Eleventh Day of November, 2014

Michelle K. Lee
*Deputy Director of the United States Patent and Trademark Office*